H. B. TAYLOR.
SYSTEM FOR ELECTRICALLY CONTROLLING AND OPERATING RAILWAY TRAFFIC
CONTROLLING APPARATUS.
APPLICATION FILED AUG. 12, 1910.
1,034,167.
Patented July 30, 1912.
4 SHEETS—SHEET 3.
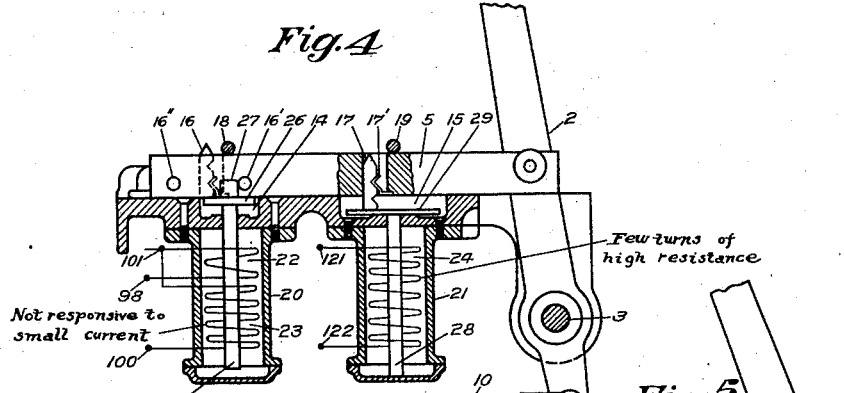
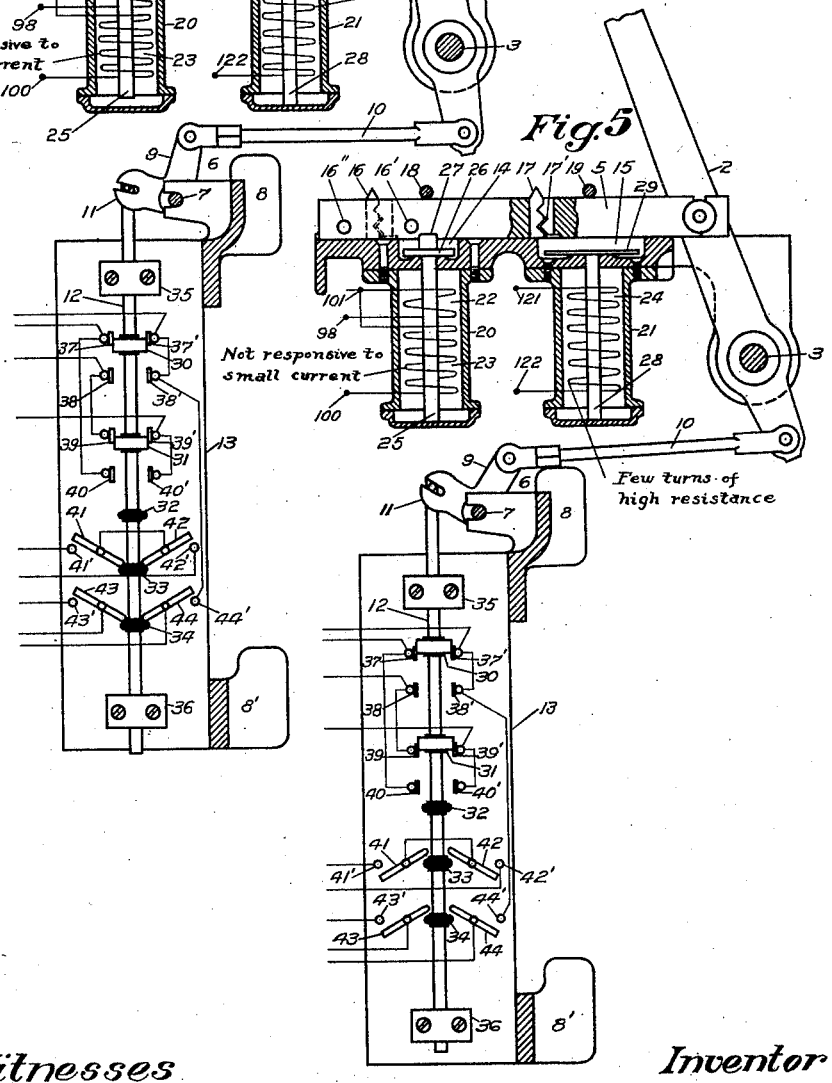
Witnesses
Inventor
Herbert B. Taylor,
by Frederick W. Cameron,
Attorney H. B. TAYLOR.
SYSTEM FOR ELECTRICALLY CONTROLLING AND OPERATING RAILWAY TRAFFIC CONTROLLING APPARATUS.
APPLICATION FILED AUG. 12, 1910.

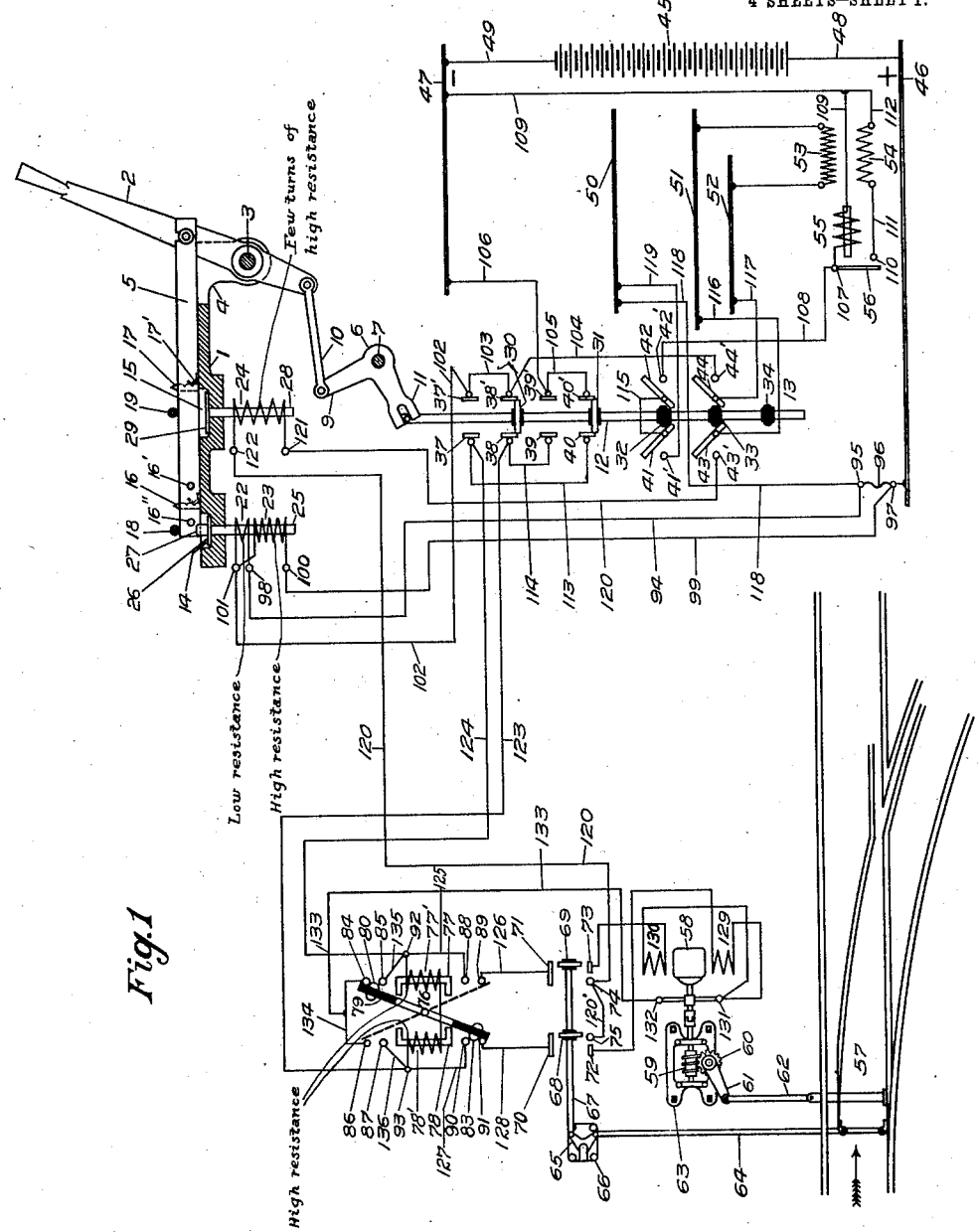

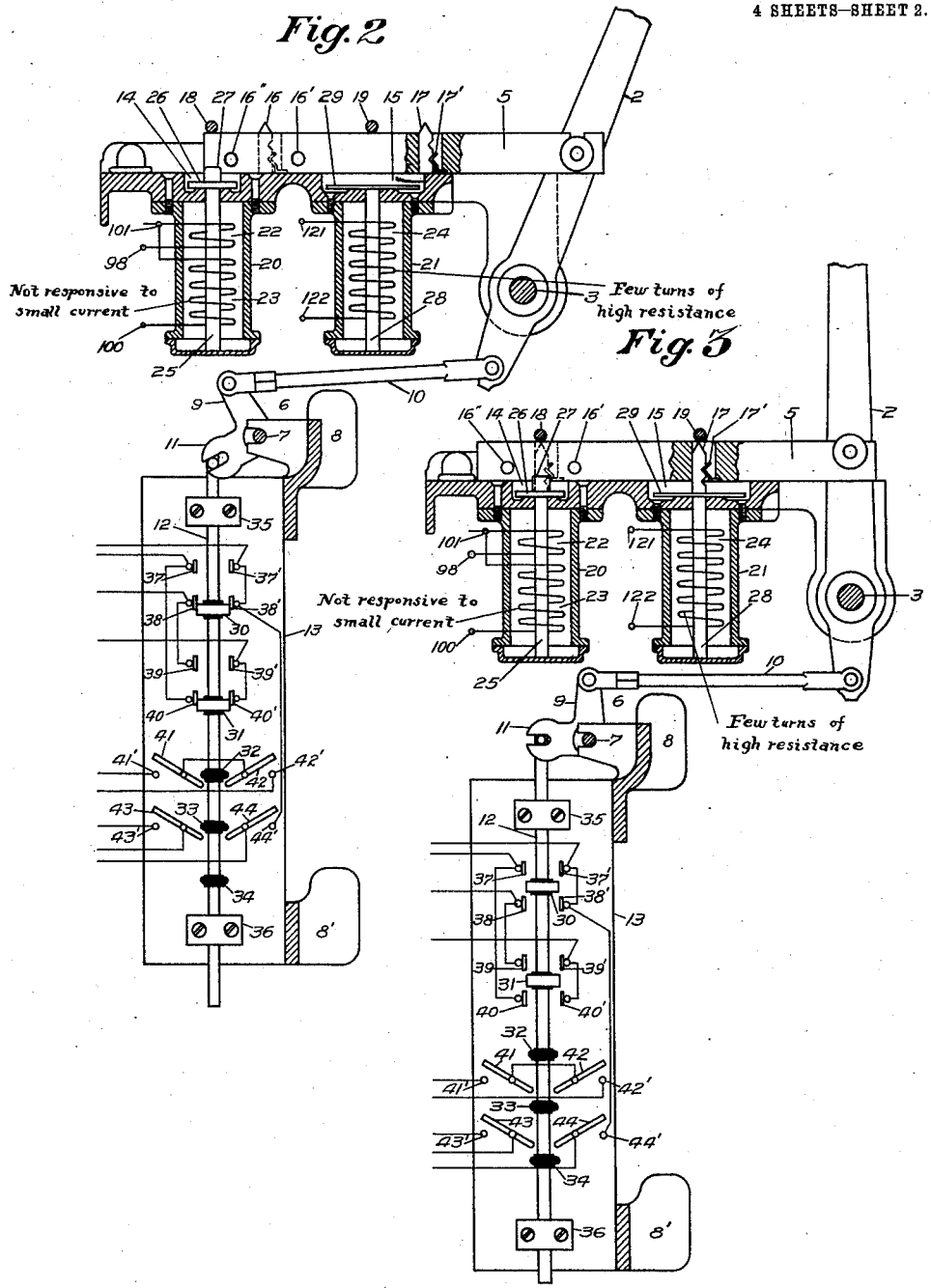

1,034,167.

Patented July 30, 1912.

4 SHEETS—SHEET 4.

Witnesses

Inventor
Herbert B. Taylor
by Frederick W. Cameron
Attorney

UNITED STATES PATENT OFFICE.

HERBERT B. TAYLOR, OF ALBANY, NEW YORK, ASSIGNOR TO FEDERAL SIGNAL COMPANY, OF ALBANY, NEW YORK, A CORPORATION.

SYSTEM FOR ELECTRICALLY CONTROLLING AND OPERATING RAILWAY-TRAFFIC-CONTROLLING APPARATUS.

1,034,167. Specification of Letters Patent. Patented July 30, 1912.

Application filed August 12, 1910. Serial No. 576,821.

*To all whom it may concern:*

Be it known that I, HERBERT B. TAYLOR, a citizen of the United States of America, residing at the city of Albany, in the county of Albany and State of New York, have invented certain new and useful Improvements in Systems for Electrically Controlling and Operating Railway-Traffic-Controlling Apparatus, of which the following is a specification.

My invention relates to improvements in systems for electrically controlling and operating railway traffic controlling apparatus, such as switches, derails, cross-overs and signals.

I am aware that all of the above named devices have been electrically operated and controlled prior to this application, but believe that the system employed for control and operation as herein described and illustrated has not before been used. I make no claim for any specific switch or signal moving device nor for a specific apparatus for controlling the operation of such switch or signal moving device, but believe that the system of electrical control and operation as set forth in this specification, combines certain new and desirable features.

Figures 6, 7:
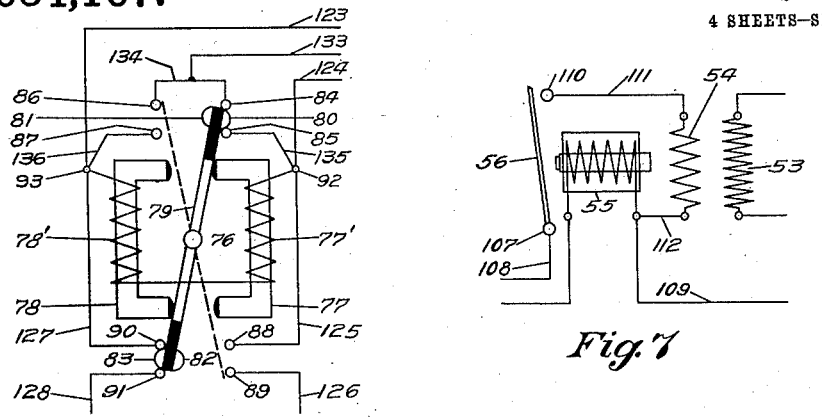
Figure 8:
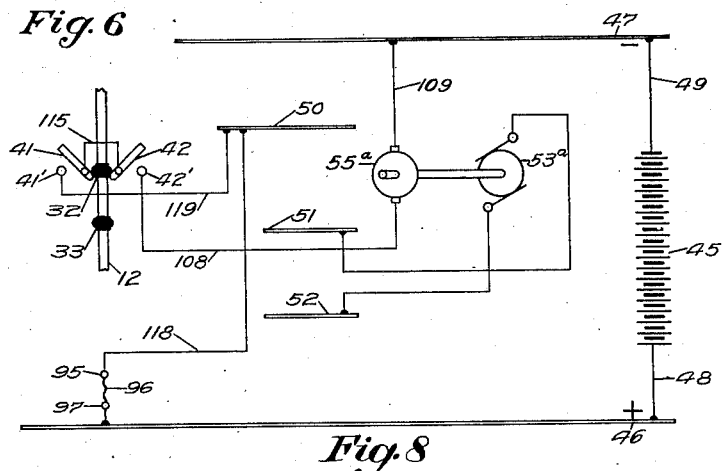
Figure 9:
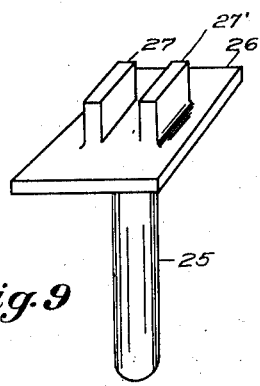
Figure 10:
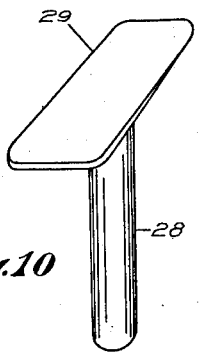

The objects of my improvements are: To provide a more simple and positive means of electrical control. To reduce the number and size of conductors required for the control and operation of the different devices. To provide a safe and reliable means of indicating to the operator that the device operated has properly responded to the movement of the controlling lever. To reduce to a minimum the failures which occasionally occur with the use of electrically controlled apparatus by dispensing with what is known as the common wire. I attain these objects by the use of the system of control and operation of various devices as described in these specifications and illustrated by the drawings which accompany it, in which:

Figure 1 represents a complete unit for the control and operation of a pair of railway switch points or a derail. Fig. 2 represents a controller with its operating lever, lock slide safety and indication magnet. The lever is shown in the normal position. Figs. 3, 4 and 5 represent the same controller and lever as in Fig. 2, but in the different positions they will occupy when being moved from the normal to the reverse position. Fig. 6 represents a reverser which is employed in connection with the operation of a pair of switch points or derail. Fig. 7 represents the apparatus for producing the inductive indication with the switch point operating unit as represented in Fig. 1. Fig. 8 represents a motor generator as an alternative means of producing the indication and can be employd in place of the apparatus shown in Fig. 7 if desired. Fig. 9 shows the core and head of the safety magnet 20. Fig. 10 shows the core and head of the indication magnet 21.

It should be understood that the illustrations are only diagrammatic, and that only such apparatus is shown as is absolutely required for the operation of the devices described, other apparatus, such as switches, automatic cut-outs, fuses, relays, etc., may be employed to make the operating plant complete in detail, but as they have no actual bearing on the devices described and claimed are omitted in order to simplify the description and render the diagrams less complicated.

The unit of control and operation as shown in Fig. 1 consists only of such parts as are essential to this description and the claims which follow.

1 represents the bed plate of an interlocking machine, 2 is the operating lever arranged to swing on the spindle, 3, which is suitably mounted in the hanger 4. A slide bar 5 is connected with the lever 2 above the spindle 3 and arranged to move across the bed plate 1 when the lever 2 is operated. A bell crank 6 is mounted to swing on a spindle 7, which is also suitably mounted in a bracket 8 (see Figs. 2, 3, 4 and 5) which is attached to the frame of the machine (not shown). The upper arm 9 of the crank 6 is connected to that portion of the lever 2 which extends below the spindle 3, by a link 10. The lower arm 11 of the crank 6 is suitably connected with the wiper rod 12 of the machine controller 13 shown in Figs. 3, 4, 5 and 6.

In the bed plate 1 is formed a short recess 14 and a longer recess 15, the functions of which will be explained later. A locking dog 16 and an indication dog 17 are arranged in the slide bar 5 in such a manner that they are free to be moved up and down through the said slide bar 5 into and out of the recesses 14 and 15 respectively. Directly over the center of the recess 14 and above and touching the slide 5 is located a rod 18, and above the center of the recess 15 and in like manner is located a rod 19. These rods 18 and 19 are suitably secured in position by being attached to the frame of the machine (not shown).

On the bed plate 1 and directly under the recess 14 is secured a safety or lock magnet 20 (see Fig. 2) and to the bed plate 1 under the recess 15, is similarly secured an indication magnet 21 (see Fig. 2). The coil of the safety or lock magnet 20 is composed of two windings 22 and 23. The winding 22 is of about one-tenth ohm resistance and is of large wire of comparatively few turns. The winding 23 is of about 300 ohms resistance and is of small wire of comparatively many turns. The coil, 24, of the indication magnet 21, is wound to about 300 ohms resistance with comparatively few turns of a high resistance wire. Through the coil of the safety magnet 20 passes a core 25 having secured thereto a head 26 with lugs or projections 27 and 27' (see Fig. 9) and through the coil of the indication magnet 21 passes a core 28 having attached thereto a head 29.

The rod 12 of the controller 13 has mounted thereon and insulated therefrom wipers 30 and 31 and also insulated tripping blocks 32, 33 and 34. This rod 12 is arranged to slide in the bearings 35 and 36 (see Fig. 3). On the controller panel, 13, are suitably mounted contacts 37, 37', 38, 38', 39, 39', 40 and 40', also movable contact fingers 41, 42, 43 and 44 and contacts 41', 42', 43' and 44'.

A source of electrical energy, 45, preferably a storage battery, although a generator would answer as well, is connected with the positive and negative buses 46 and 47 by wires 48 and 49, other buses form part of the controlling machine equipment 50, being a bus connected with each controller for supplying current to the magnet 55 and coil 54. 51, and 52, being secondary or indication buses. All the buses 46, 47, 50, 51 and 52 are supposed to extend the entire length of the controlling machine which may be made up of any number of controlling units, the buses being common to all such units.

Between the indication buses 51 and 52 is connected the indication coil 53 which is the secondary winding of a suitable induction coil or transformer, as shown in detail in Fig. 8. This secondary winding 53 is arranged adjacent to a primary winding 54 which is part of the said induction coil. Another coil, 55, called the contactor coil is adapted as will be shown to close a circuit from the battery 45 through the primary winding 54 of the induction coil.

In Fig. 1 is shown a pair of railway switch points 57, connected with a suitable device for moving them. This device may be composed of an electric motor 58, a worm 59, rotated by the motor 58, a worm gear 60 rotated by the worm 59, and a crank 61, attached to the gear 60, the worm gear and crank are mounted on a stand 63. The crank, 61, may be connected to the points 57, by the rod 61. It is obvious that with this device the switch points 57 may be moved from the normal position, as shown for the straight track, to a reverse position for the curve. A rod 64 is connected with the switch points 57 and with one arm of the bell crank 65, which crank is pivoted in the stand 66. The other arm of 65 has attached to it a rod 67 which has mounted thereon wipers 68 and 69, which wipers are electrically insulated from the said rod. The wipers, 68 and 69, are adapted to be moved between the contacts 70, 72 and 75 and 71, 73 and 74, respectively, when the rod 64, the crank 65 and the rod 67 are operated by the switch points 57.

In addition to the devices just described for the moving of the switch points there is a magnetic reverser 76. This device is composed of the field magnets 77 and 78 with their coils 77' and 78' wound thereon, and a polarized armature 79 which is mounted so as to swing freely between the magnets 77 and 78. Mounted on the armature 79, but insulated from it are two pairs of contact buttons, 80, 81 and 82, 83, when the armature 79 is in the position shown the button 80 will engage the contacts 84 and 85 and the button 83 will engage the contacts 90 and 91. When the armature 79 swings to the position shown by the dotted line the button 81 will engage contacts 86 and 87 and the button 82 will engage contacts 88 and 89.

The circuits from the storage battery 45, through the different controlling, operating and indicating devices is as follows: The battery 45, as before stated, is connected between the positive and negative buses 46 and 47, by wires 48 and 49. A wire 94 is connected to terminal 95 and thence to terminal 97 on the positive bus, through protecting fuse 96. This wire 94 extends to terminal 98 of the low resistance winding 22, of the safety magnet 20, (Fig. 2). A wire, 99, extends from the terminal 97 of the positive bus 46 to terminal 100 of the high resistance winding 23 of the safety or lock magnet 20 (Fig. 2). The opposite ends of the windings 22 and 23 of the magnet 20 are brought out to a common terminal 101, which is connected with contact 37' of the machine controller 13, by wire 102. The contact 37' is connected to contact 38' by wire 103 and contact 38' is connected to contact 44' by wire 104. Contact 39' is connected to contact 40' by wire 105 and also to the negative bus 47 by wire 106. Contact 42' is connected to terminal 107 by wire 108 to which terminal is connected one lead of the coil 55, the other lead of coil 55 connects with the negative bus 47 by wire 109. An armature 56 is pivoted at terminal 107 and is adapted to be attracted toward the coil 55 and against the contact 110 when the coil 55 is electrically energized. This contact 110 is connected by wire 111 to the primary winding 54 of the transformer and from primary winding 54 by wires 112 and 109 to negative bus 47. Contact 37 is connected to contact 40 by wire 113 and contact 38 is connected with contact 39 by wire 114. The movable contact fingers 41 and 42 are jumped together by wire 115 and the movable contact fingers 43 and 44 are connected respectively with the indication buses 51 and 52 by wires 116 and 117. A wire 118 connects the fuse terminal 95 to the contactor bus 50, and a wire 119 connects the contactor bus 50 to the contact 41'. A detail of the contactor is shown in Fig. 8. A wire 120 called the indication wire connects contact 43' to the terminal 121 of the indication magnet coil 24. The terminal 122 of the indication coil 24 connects with the indication contacts 74 and 75, which are located at the switch point moving mechanism, by a wire 120. A wire 123 called the normal operating wire connects contact 38 of the machine controller 13 to terminal 93 of the reverser 76 and a wire 124 called the reverse operating wire connects the contact 37 of the machine controller 13 to terminal 92 of the reverser 76. The windings 77' and 78' of the field magnets 77 and 78 of the reverser 76 are connected in series from terminal 92 to 93. From terminal 92, a wire 125 connects with contact 88, and from contact 89 a wire 126 connects with contact 71. In a similar manner a wire 127 connects terminal 93 with contact 90, and a wire 128 connects contact 91 with contact 70.

The motor 58 is constructed with two field coils, 129 being the normal field coil is between the contact 72 and the brush 131 of motor 58. The coil 130 which is the reverse field coil is connected between contact 73 and the brush 131 of the motor 58. The other brush 132 of the motor 58 is connected by wires 133 and 134 to the contacts 84 and 86 of the reverser 76. The contacts 85 and 87 of the reverser 76 are connected respectively to terminals 92 and 93 by wires 135 and 136.

Having described the different parts and circuits pertaining to a switch point moving apparatus I will explain how the switch points are moved from the normal position as shown, set for straight track (Fig. 1) to a reverse position which will set the points for the curved track. Assume that the controlling machine and all devices controlled or operated by it are in what I will call a normal position, see Fig. 1 also Fig. 2 of machine. Figs. 3 and 4 show the position of the controlling lever at different intervals during its movement from the normal position as shown in Fig. 2 to the reverse position as shown in Fig. 5.

I wish to explain also that the term "indication" means that current from its source of energy has energized what I call the indication circuit and indication magnet and has through the energization of the indication magnet effected the release of the controlling lever, permitting its movement to a normal or reverse position. The term "indication" is commonly used in connection with apparatus such as is described in this application and is used only to simplify this description.

The terms "reverse" and "normal" are also used for the same reason as above stated. Reverse means for instance that the lever 2 on Fig. 2 is moved to the position shown in Fig. 5, or that the switch points 57 have been moved from the position shown in Fig. 1 to a position that would shunt a train around the curve. In other words when the parts of the apparatus are in a position as indicated in Fig. 1 they are said to be normal, and when in a position exactly opposite they are said to be reversed.

If the lever 2, in Fig. 1, is moved to a position as shown in Fig. 5 the slide bar 5, which has mounted in it the sliding dogs 16 and 17 will be forced toward the left. The dogs 16 and 17, as will be seen, are pointed at their upper ends at an angle of ninety (90) degrees or less, but are straight at their lower ends as shown. Each of these dogs is constructed with two V-shaped notches into the lower one of which a small spring 17' normally rests. This spring will retain the dog either in its normal or raised position or in its lowered position, as if the dog is lowered the spring 17' will rest in its upper notch. As the slide bar 5 moves toward the left the upper ends of the said dogs 16 and 17, which are normally raised, will engage the rods 18 and 19 and be forced down by these rods into the recesses 14 and 15 respectively. Fig. 3 shows the position of the said dogs when passing under the said rods.

At the same time that the bar, 5, is moving to the left the wiper-rod 12 of the controller 13 is moving upward, due to the movement transmitted to it from the lower end of the lever 2, through the link 10 and crank 6, which is pivoted at 7 to the controller supporting bracket 8.

It will be noticed that when the lever 2 and the wiper rod 12 of the controller 13 are in their normal position that an electrical current from the battery 45 is complete, as follows: from positive pole of the battery 45, wire 48, bus 46, wires 94 and 99, safety magnet coils 22 and 23, wire 102 to contact 37', wire 103, to contact 38', wiper 30, contact 38, wire 123, terminal 93, reverser magnet coils 78' and 77' in series, terminal 92, wire 124, contact 37, wire 113, contact 40, wiper 31, contact 40', wire 105, contact 39', wire 106, negative bus 47, wire 49 to negative pole of battery 45. The energization of this circuit and the magnets 77 and 78 of the reverser 76 will tend to attract the polarized armature 79 and hold it in the position shown in Fig. 1 and Fig. 6. The amount of current flowing in this circuit is necessarily small owing to the fact that the combined resistance of the reverser magnet coils 77' and 78' is about 11,000 ohms. Therefore while the current flowing is of sufficient strength to energize the reverser magnets it is not of sufficient strength to affect the safety magnet 20 through the said current if passing through the coils 22 and 23 of magnet 20. When the slide bar 5 has reached a position as shown in Fig. 3 the wiper rod 12, of the controller 13, will have moved upward sufficiently to open the circuit just described at the contacts 38 and 38' and 40 and 40'. As the lever 2 is moved still farther the slide bar 5 also moves farther to the left and the rod 12 farther upward and will occupy a position as shown in Fig. 4. When in this position the wipers 30 and 31 on the controller rod 12 will engage the contacts 37 and 37' and 39 and 39' respectively, closing a circuit as follows: from positive pole of battery 45 to the safety magnet 20, as before described, thence by wire 102 to contact 37', wiper 30 (see Fig. 4) contact 37, reverse operating wire 124 to reverser terminal 92, through coils 77' and 78' of the reverser to terminal 93, thence by wire 123 (now the return wire) wire 114, contact 39, wiper 31, contact 39', wire 106, bus 47, wire 49, to negative pole of battery 45. The energization of this circuit will cause the polarized armature 79, of the reverser 76, to swing to a position shown by the dotted line (Figs. 1 and 6). The instant that the said armature swings to this new position the lower button 82, of the armature 79, will bridge the contacts 88 and 89, and the upper button 81 of the armature 79 will bridge the contacts 86 and 87.

The current required to move the armature as above described is very small and does not affect the safety magnet 20, but as the armature reaches the new position a heavy current will flow through the circuit and through the switch point moving motor 58 as follows: from the battery 45 to terminal 92 as before described, thence by wire 125 to contact 88, button 82 of armature 79, contact 89, wire 126, contact 71, wiper 69 which is attached to rod 67, contact 73, through reverse field coil 130, to motor brush 131, armature of motor 58, brush 132, wires 133 and 134 to contact 86, button 81 of armature 79, contact 87, wire 136, terminal 93, return wire 123, to negative pole of battery 45 as before described. While current is flowing in this circuit the lever 2 and the controller rod 12 are in what I will call the operating position and cannot be moved any farther toward the left while current is flowing through the switch point moving motor 58 for the following reason. When the dogs 16 and 17 are forced down into the recesses 14 and 15, respectively, by the rods 18 and 19, and the operating circuit is completed as described, the energization of the safety magnet 20, due to the fact that a heavy current is now flowing through its low resistance winding 22 will lift its core 25 with its head 26 (see Fig. 4). This head 26 is in the form of a flat disk with two projections 27 on its upper face (see Fig. 9). These projections straddle the slide bar 5 and when the head is lifted as in Fig. 5 project in the path of two studs 16' and 16" which project outwardly from both sides of the slide bar 5.

By referring to Fig. 4 it will be noticed that the stud 16' is in engagement with the projection 27 of the magnet core head 26 as the magnet core 25 is being held up by the energization of the magnet coils 22 and 23. It will also be observed that the dog 16 has been raised by the head 27 and that a spring similar to 17' is resting in the lower V-shaped notch of the dog 16. It will be seen that the slide bar 5 cannot be moved any farther forward until the magnet 20 becomes deënergized and its core 25 and head 26 drop down into the recess 14 and thus permit the stud 16" to pass over the projections 27. It is obvious also that if for any reason the magnet coil 22 failed to become energized when the lever 2 is moved to the position shown in Fig. 4 that the dog 16 would not be lifted out of the recess 14, but would come in contact with the left hand end of the recess 14 and thus prevent the lever being moved any farther to the left.

I have explained how the circuit of the switch point moving motor is energized by the closing of certain contacts on the controller 13, now as the motor 58 rotates it will rotate the worm 59 which rotates the worm gear 60 which has attached thereto the crank 61 which moves radially and operates the rod 62 and pulls the switch points 57 to the reverse position, i. e. to a position that a train approaching in the direction of the arrow will take the curve track.

As the points 57 move to the reverse position they will through the medium of the rod 64 and bell crank 65, which is pivoted on stand 66, move the rod 67 and the wipers 68 and 69 mounted thereon to the left. As this rod 67 moves to the left the wiper 69 will break the circuit between contact 71 and 73 and close a circuit between contact 71 and 74. On breaking the circuit at 71 and 73 the motor 58 ceases to rotate and the safety magnet 20 becomes almost entirely deënergized, permitting its core 25 to fall, thus releasing the slide bar 5 which will permit of its being moved to the reverse position as shown in Fig. 5.

It will be seen by referring to Fig. 4 that the dog 17, called the indication dog, which carried by the slide bar 5 is down in the recess 15 and that until this dog 17 is raised, the lever 2 cannot be moved to the full reverse position as shown in Fig. 5. But as the lever 2 is moved toward the reverse position, after the safety magnet core 25 drops, the wiper rod 12, of controller 13, which rod is operated by the lever 2, moves upward until the button 33 engages the movable contact fingers 41 and 42 and the button 34 engages the movable contact fingers 43 and 44. As the rod continues to move upward the buttons 33 and 34 throw the fingers 41, 42, 43 and 44 to the position shown in Fig. 5, but these fingers in moving to the said position will engage, in passing, with the contacts 41′, 42′, 43′ and 44′, momentarily closing circuits as follows: from the positive pole of the battery 45 current will flow through wire 48 to bus 46, fuse 96, wire 118, bus 50, wire 119, contact 41′, finger 41, jumper 115, finger 42, contact 42′, wire 108, terminal 107, through coil 55, wire 109, bus 47, wire 49, to negative pole of battery 45. The current flowing in this circuit will energize the coil 55 which will attract the armature 56 against the contact 110, permitting current to flow from the terminal 107 through armature 56, contact 110, wire 111, primary coil 54, wires 112 and 109 to battery, as before described. The momentary rush of current through the primary coil 54 will induce in the secondary coil 53 an extremely high E. M. F. This E. M. F. will cause a momentary flow of current as follows: from the secondary coil 53 to bus 52, wire 117, finger 44, contact 44′, wire 104, wire 103 to contact 37′, wiper 30, contact 37, wire 124, wire 125, contact 88 to 89, through button 82, wire 126, contact 71 wiper 69, contact 74, indication wire 120, through the indication magnet coil 24, wire 120, to contact 43′, finger 43, wire 116, bus 51 back to secondary coil 53. The current thus induced in the above described circuit will momentarily energize the coil 24 of the indication magnet 21 and cause the core 28 to lift for an instant the head or disk 29 (see Fig. 10) will strike the lower end of the indication dog 17 and force it up out of the recess 15, flush with the under side of the slide 5 where it will be retained by the spring 17′, thus permitting the lever 2 to be moved to the reverse position as shown in Fig. 5.

It should be understood that the movement of the lever from the operating position as shown in Fig. 4 to the reverse position as shown in Fig. 5 is continuous unless the indication circuit from the secondary coil 53 is open, or the primary coil 54 fails to become energized. In either of such instances the indication dog 17 would not be lifted out of the recess 15 which would result in preventing the complete movement of the lever 2. When the lever 2 has been moved to the reverse position as shown in Fig. 5 the fingers 41, 42, 43 and 44 will have passed off the contacts 41′, 42′, 43′ and 44′, thus breaking the primary and indication circuits.

From the foregoing description and reference to the several figures it will be observed that the controlling lever 2 may be moved to what I call the operating position, that the dogs 16 and 17 are positively forced down into the recesses 14 and 15 by the rods 18 and 19, thus limiting the movement of lever 2; that the switch point operating circuit must be properly energized before the switch 57 will be moved, or before the safety magnet 20 will lift its core and force the dog 16 out of the recess 14, that the core of the safety magnet 20 must drop before the lever 2 can be moved out of the operating position, that the lever 2 must be moved farther after the safety magnet 20 becomes sufficiently deënergized (due to the opening of the switch point operating circuit) before the primary and indication circuits can be completed, and finally, the lever 2 cannot be moved to a full reverse position unless the primary circuit has been completed, and the current induced in the secondary coil 53 has energized the complete indication circuit as described, thus causing the core of the indication magnet 24 to lift and force up the dog 17 out of the recess 15.

A movement of the lever 2 from the reverse position as shown in Fig. 5 back again to the normal position as shown in Figs. 1 and 2 is performed in a similar manner to the movement just described, except that the functions performed in sequence by the different devices which constitute a complete operating unit are for the operation of the switch points 57 in the opposite direction.

In Fig. 8 I show a motor generator set for producing the "indication" in place of the apparatus shown in Fig. 8. This machine consists of a motor which will operate on current from the storage battery 45 and is controlled in a similar manner to the device in Fig. 7, i. e. when a lever is put in the "indicating" position current from battery 45 will flow to positive bus through fuse 96, wire 118, to bus 50, wire 119, to contact 41', finger 41, wire 115, finger 42, contact 42', wire 108 to motor 55$^a$, (which is equivalent to the magnet 55) then by wire 109 back to bus 47 and thence to battery 45. When the circuit just described is closed the motor 55$^a$ will operate and being rigidly connected with the generator 53$^a$ will operate the generator 53$^a$ also. The generator 53$^a$ is connected between the "indication" buses 51 and 52, therefore the current generated by 53$^a$ will pass over the "indication" circuit, as would the current from the secondary coil 53. The generator 53$^a$ should be wound to deliver current at an E. M. F. of 500 volts or more, if desired.

It should be here explained what are the functions of the double winding in the safety magnet. The current which operates a switch point or signal motor flows through these windings in proportion to the resistance of each. The low resistance winding 22 taking very nearly all the current. However there are so few ampere turns in this low resistance winding that after the first rush of current which will cause the core 25 to lift the said core will settle back to its normal position if it were not for the current flowing through the high resistance winding of many ampere turns. Furthermore if owing to an overload on the operating circuit heavy enough to open the fuse 96 the high resistance winding 23 which is connected directly with the positive bus 46 will still hold the core 25 up and hold the slide bar 5 from further movement.

In this system of switch and signal control and operation it will be noted that no common return wire is used as in other systems now in use, for a switch, derail etc. only two wires are required for either normal or reverse operation, one wire being used for outgoing current and the other being used for the return current, in addition only one indicating wire (which may be of very small size) is required as the indication circuit is composed of one of the operating wires and the additional indication wire. For a signal only two wires are required the operation and indication being effected over the same wires. Therefore the cause of much trouble is eliminated by dispensing with a common wire. The method of producing and transmitting an indication is also a means of rendering this system extremely safe as the indication magnet is wound in such a manner that the E. M. F. of the operating source of energy cannot energize it, an E. M. F. of at least three times that of the operating source being required.

Another point of merit in connection with the indication is that a lever must be moved to the indicating position after the operation of the switch or signal is over. Thus a cross with another indication wire will not affect the lever being operated as all indication circuits of other levers and the indication circuit of the lever being operated are open until after the operation is over and can only then be closed.

Still another important feature is that no special devices for protection against crosses or grounds are necessary, as each switch or signal is operated as a unit and protected by its own separate fuse which if blown out or opened will not affect any other unit.

What I claim as my invention and desire to secure by Letters Patent is:

1. A railway switch controlling system, consisting of a source of electric energy; switch moving means; a circuit for the operation of the moving means and a circuit for transmitting an indication current to and from the moving means; a lever and a controller operated by the said lever; means associated with the said controller for energizing and deënergizing said operating and indicating circuits and means associated with the said lever for preventing the energization of the indication circuit until after the switch operating circuit has become deënergized.

2. A railway switch controlling system, consisting of a source of energy; a switch moving device; an operating circuit for the switch moving device; an indication current producing device and a circuit for the same; an operating lever and a circuit controller actuated thereby; contacts on the said controller for energizing and deënergizing the said operating circuit, and contacts on the said controller for energizing and deënergizing the indication circuit and means associated with the said operating lever for preventing the closing of the indication contacts until after the deënergization of the operating circuit.

3. A railway switch controlling system, consisting of a switch moving device and a circuit for the same; a source of energy for the circuit; means for connecting and disconnecting the source of energy to and from the said circuit; an indication circuit for the moving device and an indication magnet connected in the indication circuit adapted to operate only with current of higher electromotive force; means of supplying the indication circuit with current of a higher electromotive force than that of the source of energy, said means becoming operative only after the deënergization of the circuit of the switch moving device.

In testimony whereof I have affixed my signature in presence of two witnesses.

HERBERT B. TAYLOR.

Witnesses:
 LOTTIE PRIOR,
 FREDERICK W. CAMERON.

Copies of this patent may be obtained for five cents each, by addressing the "Commissioner of Patents. Washington, D. C."